United States Patent [19]
Capps et al.

[11] 3,725,422
[45] Apr. 3, 1973

[54] NEW ORGANIC SULFUR COMPOUNDS AND METHODS FOR THEIR PRODUCTION

[75] Inventors: David B. Capps, Ann Arbor, Mich.; Alexander Erdelyi, Vaucluse, New South Wales, Australia

[73] Assignee: Parke, Davis & Company,, Detroit, Mich.

[22] Filed: Sept. 7, 1971

[21] Appl. No.: 178,469

[52] U.S. Cl. .........260/294.8 E, 260/270 R, 424/266
[51] Int. Cl. .............................................C07d 31/50
[58] Field of Search.....................260/294.8 E, 270 R

[56] References Cited

UNITED STATES PATENTS 3,423,416  1/1969  Hyatt.............................260/294.8 E Primary Examiner—Alan L. Rotman
Attorney—Robert R. Adams et al.

[57] ABSTRACT

1-Carboxyalkyl esters of 5-chlorodithio-2-pyridinecarbamic acid; and salts and lower alkyl esters of those 1-carboxyalkyl esters. The compounds are antiparasitic agents having nematocidal activity and antifungal activity against various species. They can be produced by reacting a tertiary amine salt of 5-chlorodithio-2-pyridinecarbamic acid with a haloalkanoic acid salt or haloalkanoic acid ester. The tertiary amine salts of 5-chlorodithio-2-pyridinecarbamic acid can be produced by reacting 2-amino-5-chloropyridine with carbon disulfide and a tertiary amine.

9 Claims, No Drawings

NEW ORGANIC SULFUR COMPOUNDS AND METHODS FOR THEIR PRODUCTION

SUMMARY AND DETAILED DESCRIPTION

The present invention relates to new organic sulfur compounds. More particularly, the invention relates to certain 1-carboxyalkyl esters of 5-chlorodithio-2-pyridinecarbamic acid, to salts and lower alkyl esters of those 1-carboxyalkyl esters, and the methods for the production of the foregoing compounds. The compounds of the invention can be represented by the formula

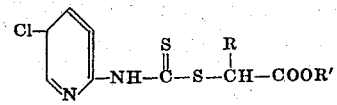

in which R represents hydrogen or lower alkyl, and R' represents hydrogen, a salt-forming cation, or lower alkyl. When R or R' represents lower alkyl, it is preferably an alkyl group of not more than 6 carbon atoms. Some examples of salt-forming cations are pharmaceutically-acceptable alkali metal, alkaline earth metal, aluminum, ammonium, and substituted ammonium cations.

In accordance with the invention, the compounds off the foregoing formula can be produced by reacting a tertiary amine salt of 5-chlorodithio-2-pyridinecarbamic acid having the formula

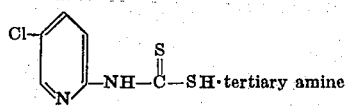

with a haloalkanoic acid salt or haloalkanoic acid ester of the formula

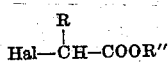

where R is as defined before, R" represents a salt-forming cation (preferably an alkali metal cation) or lower alkyl, and Hal represents halogen, preferably chlorine or bromine. The haloalkanoic acid reactant can optionally be employed in the form of the free carboxylic acid with an equivalent of a base such as an alkali metal hydroxide, an alkali metal carbonate, an alkali metal alkoxide, or a tertiary amine, in which case the reactant present in the mixture is the haloalkanoic acid salt in which R" represents a salt-forming cation. In the tertiary amine salt of 5-chloridithio-2-pyridinecarbamic acid, the tertiary amine selected is preferably one having a $pK_a$ greater than 9. Examples of such tertiary amines are triethylamine, triisobutylamine, trimethylamine, tripropylamine, N-methylpiperidine, N,N-dimethylbenzylamine, N,N-diethylbenzylamine, and N-methyldiethylamine. A preferred tertiary amine is triethylamine. Some suitable solvents for the reaction are water; a lower alkanol such as methanol, ethanol, or isopropyl alcohol; a tertiary amide such as N,N-dimethylformamide or N,N-dimethylacetamide; an ether such as tetrahydrofuran or dioxane; acetonitrile, or mixtures thereof. When R" represents a salt-forming cation, a preferred solvent is water or aqueous ethanol.

When R" represents lower alkyl, a preferred solvent is ethanol. The reactants can be employed in approximately equimolar quantities or, if desired, a moderate excess of either can be used. The time and temperature of the reaction are not particularly critical. In general, the reaction can be carried out at a temperature from about 0° to 75° C. or the reflux temperature of the solvent for from 15 minutes to 24 hours, with the longer times being used at the lower temperatures. Preferred conditions are from 20 to 50° C. for a reaction time of 45 minutes to 4 hours. When R" represents lower alkyl, the product is isolated directly as the 5-chlorodithio-2-pyridinecarbamic acid, 1-carboxyalkyl ester, lower alkyl ester. When R" represents a salt-forming cation, the product is isolated directly as the 5-chlorodithio-2-pyridinecarbamic acid, 1-carboxyalkyl ester, carboxylate salt, or, following acidification, as the 5-chlorodithio-2-pyridinecarbamic acid, 1-carboxyalkyl ester, free acid form. The products in which R represents lower alkyl can also be obtained in either racemic, or, by resolution, optically-active d- and l-forms.

Tertiary amine salts of 5-chlorodithio-2-pyridinecarbamic acid, required as starting materials in the foregoing process, can be prepared by reacting 2-amino-5chloropyridine with carbon disulfide and a tertiary amine in a solvent such as pyridine.

The free carboxylic acids of the invention form carboxylate salts with any of a variety of inorganic and organic bases. Pharmaceutically-acceptable salts are formed with such bases as sodium hydroxide, potassium hydroxide, calcium hydroxide, sodium carbonate, potassium bicarbonate, ammonia, diethylamine, 2-hydroxyethylamine, and choline. Pharmaceutically-acceptable magnesium and aluminum salts are formed by reacting the sodium slat or other soluble carboxylate salts with magnesium chloride or aluminum chloride in aqueous medium. The preferred carboxylate salts of the invention are the pharmaceutically-acceptable salts of an alkali metal, an alkaline earth metal, aluminum, ammonia, or a substituted ammonia. The carboxylic acids and their salts are interconvertible by adjustment of the pH. They differ in solubility properties but are otherwise equivalent for the purposes of the invention.

The compounds of the invention can exist in anhydrous form as well as in solvated, including hydrated, forms. In general, the hydrated forms and the solvated forms with pharmaceutically-acceptable solvents are equivalent to the anhydrous or unsolvated form for the purposes of the invention.

The compounds of the invention are new chemical compounds of value as pharmacological agents and as chemical intermediates. They are antiparasitic agents and especially nematocidal and antifungal agents. Their activity as nematocidal agents can be demonstrated against the parasite *Nematospiroides dubius* in mice. Mice infected with this intestinal parasite are given a test compound by gavage. The selected dose is divided into two portions and both portions are given the same day. The effectiveness of the test compound is expressed as an approximate mean effective dose, $ED_{50}$, which is the dose that reduces the worm burden in treated animals by 50 percent. The following $ED_{50}$ values were found for representative compounds of the invention. 5-Chlorodithio-2-pyridinecarbamic acid, 1- carboxyethyl ester, 8 mg./kg.; 5-chlorodithio-2-pyridinecarbamic acid, 1-carboxypropyl ester, 4 mg./kg.; 5-chlorodithio-2-pyridinecarbamic acid, carboxylmethyl ester, methyl ester, 8 mg./kg.; 5-chlorodithio-2-pyridinecarbamic acid, carboxymethyl ester, isopropyl ester, 4 mg./kg. The compounds of the invention are active against hookworms (*Ancylostoma caninum*) and ascarids (*Toxocara canis*) in dogs, generally in single oral doses of 25 mg./kg. or less. In addition, they are active against *Ascaridia galli* in chickens. 5-Chlorodithio-2-pyridinecarbamic acid, carboxymethyl ester, butyl ester, cleared chickens of this parasite when given in a normal diet at 0.05 percent concentration for 1 week. As antifungal agents, the compounds of the invention are effective against pathogenic and non-pathogenic yeasts such as *Candida albicans* and human and animal filamentous fungal pathogens such as *Trichophyton mentagrophytes*. The compounds are usually administered orally, although for certain purposes parenteral or topical administration can be used.

The invention is illustrated by the following examples.

EXAMPLE 1

A reaction mixture is prepared by adding 140.4 g. of 5-chlorodithio-2-pyridinecarbamic acid, salt with one formula weight triethylamine, to a solution of 53.6 g. of sodium chloroacetate in 1.3 liters of water and 1.6 liters of ethanol. The mixture is heated to 40° C. and then allowed to stand at room temperature for 16 hours, diluted with 2 liters of water, and acidified with acetic acid. The insoluble product is collected on a filter, washed with water, and dried. It is 5-chlorodithio-2-pyridinecarbamic acid, carboxymethyl ester; m.p. 142°–143° C., after crystallization from acetonitrile.

The sodium salt is obtained by adding 10 ml. of 1 N aqueous sodium hydroxide to a solution of 2.63 g. of the free acid described above in 50 ml. of ethanol and evaporating the resulting solution under reduced pressure.

The choline salt is obtained by adding a solution of 1.4 g. of choline chloride in 10 ml. of methanol to a solution of 2.85 g. of the sodium salt (as prepared above) in 50 ml. of methanol. The mixture is stirred for one hour and filtered to remove sodium chloride. The filtrate is evaporated under reduced pressure to give the choline salt.

The starting material can be obtained as follows. Carbon disulfide, 55 ml., is added to a solution of 100 g. of 2-amino-5-chloropyridine and 107 ml. of triethylamine in 250 ml. of pyridine. The mixture is allowed to stand at room temperature for 60 hours. The insoluble product which separates is collected on a filter and dried. It is 5-chlorodithio-2-pyridinecarbamic acid, salt with one formula weight triethylamine; m.p. 113°–114° C. with decomposition. By the substitution of 145 ml. of tripropylamine for the triethylamine in the foregoing procedure, the product obtained is 5-chlorodithio-2-pyridinecarbamic acid, salt with one formula weight tripropylamine.

EXAMPLE 2

With stirring at 5° C., a suspension of 61.2 g. of 5-chlorodithio-2-pyridinecarbamic acid, salt with one formula weight triethylamine, in 500 ml. of water is added to a solution of 30.6 g. of α-bromopropionic acid and 8.0 g. of sodium hydroxide in 500 ml. of 95 percent ethanol. The mixture is stirred and warmed to 40° C. over a period of one hour, held at that temperature for an additional 2.5 hours, cooled to 20° C., and filtered. The filtrate is acidified with acetic acid and diluted with 250 ml. of water. The insoluble product is collected on a filter, washed with water, and dried. It is 5-chlorodithio-2-pyridinecarbamic acid, 1-carboxyethyl ester; m.p. 136°–137° C. with decomposition.

EXAMPLE 3

A suspension of 27.4 g. of 5-chlorodithio-2-pyridinecarbamic acid, salt with one formula weight triethylamine, in 200 ml. of water is added to a solution of 9.6 g. of α-bromobutyric acid and 3.6 g. of sodium hydroxide in 24 ml. of water. The mixture is stirred and heated at 40° C. for 2 hours, cooled to 20° C., and filtered. The filtrate is extracted with dichloromethane and the dichloromethane extract is extracted with 200 ml. of 1 N aqueous sodium carbonate. The aqueous phases are combined and acidified with hydrochloric acid and extracted with dichloromethane. This dichloromethane extract is evaporated under reduced pressure to give a residue of 5-chlorodithio-2-pyridinecarbamic acid, 1-carboxypropyl ester; m.p. 125°–127° C. with decomposition, after crystallization from acetonitrile.

EXAMPLE 4

With vigorous stirring, 9.3 ml. of methyl chloroacetate is added over a 10-minute period to a suspension of 30.0 g. of 5-chlorodithio-2-pyridinecarbamic acid, salt with one formula weight triethylamine, in 180 ml. of 95 percent ethanol. The resulting mixture is stirred 1.5 hours at room temperature and then diluted with an equal volume of cold water. The insoluble product is collected on a filter. It is 5-chlorodithio-2-pyridinecarbamic acid, carboxymethyl ester, methyl ester; m.p. 127°–128° C. after crystallizations from ethanol.

EXAMPLE 5

With stirring, 32.6 ml. of ethyl chloroacetate is added to a suspension of 85.9 g. of 5-chlorodithio-2-pyridinecarbamic acid, salt with one formula weight triethylamine, in 470 ml. of 95 percent ethanol. The mixture is heated to 43° C., stirred without further heating for 1.5 hours, and then diluted with 250 ml. of cold water. The insoluble product is collected on a filter. It is 5-chlorodithio-2-pyridinecarbamic acid, carboxymethyl ester, ethyl ester; m.p. 137°–139° C. after crystallization from ethanol.

EXAMPLE 6

A mixture of 15.3 g. of 5-chlorodithio-2-pyridinecarbamic acid, salt with one formula weight triethylamine, 7.5 g. of propyl chloroacetate, and 70 ml. of ethanol is stirred and heated to 45° C. Stirring is continued an additional 1.5 hours while the mixture is allowed to cool.

It is then diluted with 125 ml. of water and chilled to 0°–5° C. The insoluble product is collected on a filter. It is 5-chlorodithio-2-pyridinecarbamic acid, carboxymethyl ester, propyl ester; m.p. 96°–97° C. after crystallization from 95 percent ethanol.

By the foregoing procedure, with the substitution of 8.3 g. of butyl chloroacetate for the propyl chloroacetate, the product is 5-chlorodithio-2-pyridinecarbamic acid, carboxymethyl ester, butyl ester; m.p. 91°–92° C. after crystallization from ethanol.

By the foregoing procedure, with the substitution of 8.3 g. of isobutyl chloroacetate for the propyl chloroacetate, the product is 5-chlorodithio-2-pyridinecarbamic acid, carboxymethyl ester, isobutyl ester; m.p. 98°–99° C. after crystallizations from ethanol.

By the foregoing procedure, with the substitution 7.5 g. of isopropyl chloroacetate for the propyl chloroacetate, the product is 5-chlorodithio-2-pyridinecarbamic acid, carboxymethyl ester, isopropyl ester; m.p. 132°–133.5° C. after crystallization from ethanol.

EXAMPLE 7

A mixture of 15.0 g. of 5-chlorodithio-2-pyridinecarbamic acid, salt with one formula weight triethylamine, 10.0 g. of tert-butyl bromoacetate, and 70 ml. of ethanol is stirred and heated to 45° C. Stirring is continued an additional 45 minutes while the mixture is allowed to cool. It is then diluted with 125 ml. of water and chilled to 0°–5° C. The insoluble product is collected on a filter. It is 5-chlorodithio-2-pyridinecarbamic acid, carboxymethyl ester, tert-butyl ester; m.p. 141°–142.5 C. after crystallization from ethanol. The same product is obtained by the substitution of 17.0 g. of 5-chlorodithio-2-pyridinecarbamic acid, salt with one formula weight tripropylamine, in the foregoing procedure.

We claim:

1. A compound of the formula

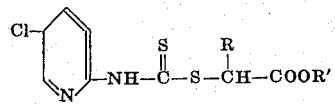

where R is a member of the class consisting of hydrogen and lower alkyl, and R' is a member of the class consisting of hydrogen, pharmaceutically acceptable salt-forming cations, and lower alkyl.

2. A compound according to claim 1 wherein R' is hydrogen.

3. A compound according to claim 2 which is 5-chlorodithio-2-pyridinecarbamic acid, 1-carboxypropyl ester.

4. A compound according to claim 1 wherein R' is lower alkyl.

5. A compound according to claim 4 which is 5-chlorodithio-2-pyridinecarbamic acid, carboxymethyl ester, methyl ester.

6. A compound according to claim 4 which is 5-chlorodithio-2-pyridinecarbamic acid, carboxymethyl ester, ethyl ester.

7. A compound according to claim 4 which is 5-chlorodithio-2-pyridinecarbamic acid, carboxymethyl ester, butyl ester.

8. A compound according to claim 4 which is 5-chlorodithio-2-pyridinecarbamic acid, carboxymethyl ester, isopropyl ester.

9. A compound according to claim 4 which is 5-chlorodithio-2-pyridinecarbamic acid, carboxymethyl ester, propyl ester.

* * * * *